United States Patent [19]
Perlin

[11] Patent Number: 6,115,053
[45] Date of Patent: *Sep. 5, 2000

[54] COMPUTER ANIMATION METHOD AND SYSTEM FOR SYNTHESIZING HUMAN-LIKE GESTURES AND ACTIONS

[75] Inventor: Kenneth Perlin, New York, N.Y.

[73] Assignee: New York University, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/284,799

[22] Filed: Aug. 2, 1994

[51] Int. Cl.$^7$ .................................................. G06T 13/00
[52] U.S. Cl. ........................................... 345/475; 345/473
[58] Field of Search ............................ 395/152 MS, 152, 395/173–175, 949–960; 345/122, 473, 475

[56] References Cited

PUBLICATIONS

Brooke, N.M., Computer Graphics Animations of Talking Faces Based on Stochastic Models, Institute for Electrical and Electronics Engineers, v. 1, pp. 73–76, Apr. 1994.

Carlsson et al., "How to build a multimedial communication/creation system for music and human motion", Multimedia System, Interaction, and Applications, Kjelldahl (ed.), pp. 152–169, Apr. 1991.

Shinya et al., "Stochastic motion—motion under the influence of wind", Computer Graphics Forum, v. 11, n. 3, pp. C119–28, Sep. 1992.

Thalmann et al., "Complex models for animating synthetic actors", IEEE Computer Graphics & Applications, v. 11, n. 5, pp. 32–44, Sep. 1991.

Sun et al., "A technique for animating natural behavior in complex scenes", IEEE Int'l Conf. on Systems, Man, and Cybernetics, pp. 1271–7 v. 2, Oct. 1991.

Badler et al, "Posture Interpolation with Collision Avoidance", Computer Animation, 1994 Proceedings, Sep. 1994, pp. 13–20.

Calvert et al, "Towards the Autonomous Animation of Multiple Human Figures", Computer Animation, 1994 Proceedings, Sep. 1994, pp. 69–75.

Monheit et al, "A Kinematic Model of the Human Sine and Torso", IEEE Computer Graphics and Applications Magazine, Mar. 1991, vol. 11, No. 2, pp. 29–38.

Lasko–Harvill et al, "From DataGlove To DataSuit", *COMPCON Spring '88 IEEE Computer Society Int'l*, 1988, pp. 536–538.

Calvert et al, "Desktop Animation of Multiple Human Figures", *IEEE Computer Graphics and Applications Magazine*, May 1993, vol. 13, No. 3, pp 18–26.

*Primary Examiner*—Mark R. Powell
*Assistant Examiner*—Jeffrey Allen Rossi
*Attorney, Agent, or Firm*—BakerBotts, LLP

[57] ABSTRACT

A computer animation method for creating computer generated animated characters which realistically perform human-like actions. Actions of an animated character are produced as a combination of motions of a plurality of joints. A number of gesture actions are displayed and defined as a series of frames generated by specifying rotational ranges and speeds of rotation on a number of rotational axes of each joint for each gesture action. The actions of each animated character appear as a weighted average of gesture actions. Gesture actions may also be combined and displayed simultaneously. By gradually varying the weight of active gesture actions, transitions between gestures are smooth and realistic.

22 Claims, 3 Drawing Sheets

SYSTEM STRUCTURE

GESTURE SYNTHESIZER

GOAL DETERMINATION MODULE

COMPUTER ANIMATION METHOD AND SYSTEM FOR SYNTHESIZING HUMAN-LIKE GESTURES AND ACTIONS

BACKGROUND INFORMATION

The quality of computer animation depends largely on its ability to convey a sense of realism so that the animated figures on the screen resemble the actions of real people and animals. Excellent computer generated animation programs are capable of portraying animated human-like characters which convey and perform human-like emotions and movements. The greater the sense of realism exhibited by an animated character, for example, emotionally interactive image puppets, the more the computer animation program is desired and appreciated by the using public.

In order for the animated characters to be able to convey and perform a wide variety of human-like emotions and movements, the computer programmer is generally obligated to write a separate subroutine (module) for every emotion or movement desired to be incorporated in the animated character's persona.

Due to mass storage and feasibility constraints of presently commercially available digital computer systems, computer programmers can only simulate in animated characters a very limited number of emotions. These emotions are the same for each individual animated character and thus the animation program lacks a sense of realism.

Emotional expressiveness denotes the capability of the animated character to simulate human emotions, such as happiness, sadness, sarcasm, and inquisitiveness since it is very difficult to exhibit emotion in an animated character, computer programmers have concentrated on giving animated characters the ability to move and interact somewhat like humans. By utilizing vector and matrix mathematics, computer programmers have managed to incorporate into animated characters a few basic kinematic (movement) characteristics, such as translate, rotate, swivel and scale. (See, e.g., Girard et al., "Computational Modeling for the Computer Animation of Legged Figures; *Siggraph '85 Proceedings*, Vol. 19, No. 3, 1985, pp. 263–270). In addition, computer programmers have managed to incorporate a few human-like gestures into the animated characters. For example, when a human is explaining something, his/her arms may wave about in a particular way. However, most computer animation packages lack the capability of conveying "emotional expressiveness" to the animated character, indicative of the movements or gestures portrayed.

An objective shared by many computer programmers is to have each animated character exhibit a large number of individualistic emotions which correspond to the character's physical gestures.

Therefore, it is an object of the present invention to create animated characters which have the capability of conveying human-like emotions and movements and/or gestures portrayed in order to convey a sense of realism. A further objective of the present invention is to provide a method for conveying a smooth transition from one gesture to another.

An additional object of the present invention is to provide the animator with the capability of simulating a large number of emotions and movements without having to write a separate subroutine (module) for each emotion and movement.

A further object of the present invention is to portray animated video and/or movie characters having good visual representations of the expressiveness of human emotion together with real-time responsiveness.

Still another object of the present invention is to portray animated video and/or movie characters as sensitive to their surroundings, so that, for example, the characters successfully avoid obstacles and navigate openings such as doors.

An additional object of the present invention is to provide a means for restricting character movements, for example, requiring a character to face forward at various times.

These and other objects of the present invention become more apparent in the following sections.

SUMMARY OF THE INVENTION

The present invention relates to a gesture synthesizer for animation of human and animal characters by a succession of video and/or movie images. The invention provides the animator with a library of building block gesture "actions" or modules, such as standing, walking, and specific dancing movements. These gesture actions are preferably combined in sequences, enabling the animator to easily create sophisticated animation sequences, a process which is currently very expensive and requires custom programming. The life-like nature of these building block actions, combined with realistic transitioning from one action to another, enables these animated characters to convincingly convey emotion and to respond to each other and respond to a changing backdrop, all in real time.

The invention incorporates information from procedural texture synthesis and applies that information to the control of the emotional effect of human-like animation figures. Procedural texture synthesis simulates the appearance of realistic texture by combining simple stochastic functions with an interpreted computer language, as described in Perlin, "An Image Synthesizer", *Siggraph '85 Proceedings*, Vol. 19, No. 3, 1985, pp. 287–296. The techniques of procedural texture synthesis are used in the computer industry, appear in commercial 3D rendering packages, and are present in various computer graphic films and television commercials.

The present invention uses the procedural texture synthesis approach to control limb motion. Controlled stochastic functions are used to control limb motion, over time, of an animated character. Different stochastic noises or "textures" (such as the textures noted above) can be combined to exhibit actions that convey different emotions.

This approach allows realistic interaction among animated characters/figures without the need for low-level manual control. The programmer/user can specify a sequence and/or combination of different gesture actions. Each action is implemented as a set of coupled frequency and range of pseudorandom time-varying signals sent to each limb. The transition from one action to the next is smooth and life-like. The present invention allows control over average position, and frequency of undulation, while conveying a "natural" quality to all motion.

The present invention enables one to create animated characters which have the capability of conveying and performing human-like motions and movements, including the ability to navigate obstacles. In addition, the invention allows one to simulate a large number of emotions and movements without having to write a separate subroutine (module) in the computer program for each gesture or to solve complex equations. Further, since the system of the present invention applies stochastic noise to create time varying parameters, it is able to portray a good visual representation of the expressiveness of human emotion, together with real time responsiveness to the corresponding gestures.

In one embodiment of the present invention, a menu of thirty gesture actions, such as "walking", "latin rumba", and "fencing", are presented to the user. The user would move a cursor to select the desired gesture actions and their order and timing. The motion of the animated character body is defined at the joint level by a joint-by-joint convex sum of weighted actions. Each body part, such as a head, a wrist, a lower arm, an upper arm, a lower leg, an upper leg, etc. is attached at a joint. Preferably, there are nineteen joints.

Each joint has three independent axes of rotation (i.e., about the x, y and z axes). Each axis of rotation is associated with two action-specific key reference angles (parameters). Each axis is further associated with a third parameter which is a function of time, and which may be expressed in terms of a sine, cosine or noise function. This third parameter (time) controls the speed of movement by determining at any given moment where, in the allowable range of rotation, each body part is positioned.

The sequence from one action to the next action is selected by the animator/user. A smooth and natural-looking transition from one action to the next selected action is automatically generated by the software computer program which controls the transition at the joint level. The animator's selection turns a control boolean value from 0 to 1 or from 1 to 0. Internally, this boolean value is used to drive a continuous parameter, e.g., via an integrator function, from 0 to 1 or 1 to 0 in an S-shaped curve. Each joint is defined for its three axes of rotation for each action as being on an imaginary scale of 0 (no movement) to 1 (full movement). During the transition, the original action's motions gradually decrease from 1 to 0 while, simultaneously, the succeeding action's motions increase, from 0 to 1.

BRIEF DESCRIPTION OF THE DRAWINGS

Other objectives and features of the present invention will be apparent from the following detailed description taken in conjunction with the accompanying drawings.

DETAILED DESCRIPTION

The present invention relates to a gesture synthesizer for image animation. It is a method to provide a customized computer animation program which allows the easy creation of animated characters that convey emotion through their gestures and/or movements. *Webster's Third New International Dictionary* defines gesture as a movement usually of the body or limbs that symbolizes or emphasizes an idea, sentiment or attitude. For example, when someone, in a particular culture, is explaining something, his/her arms will wave about in a particular way. Different people, and the same people in different emotional states, will do this in a way that can be defined statistically. The gesture synthesizer of the present invention illustrates the rhythm, the range of motion, the average posture, and the degree of regularity or irregularity of movement together with the emotions indicative of each gesture.

Figure 2:
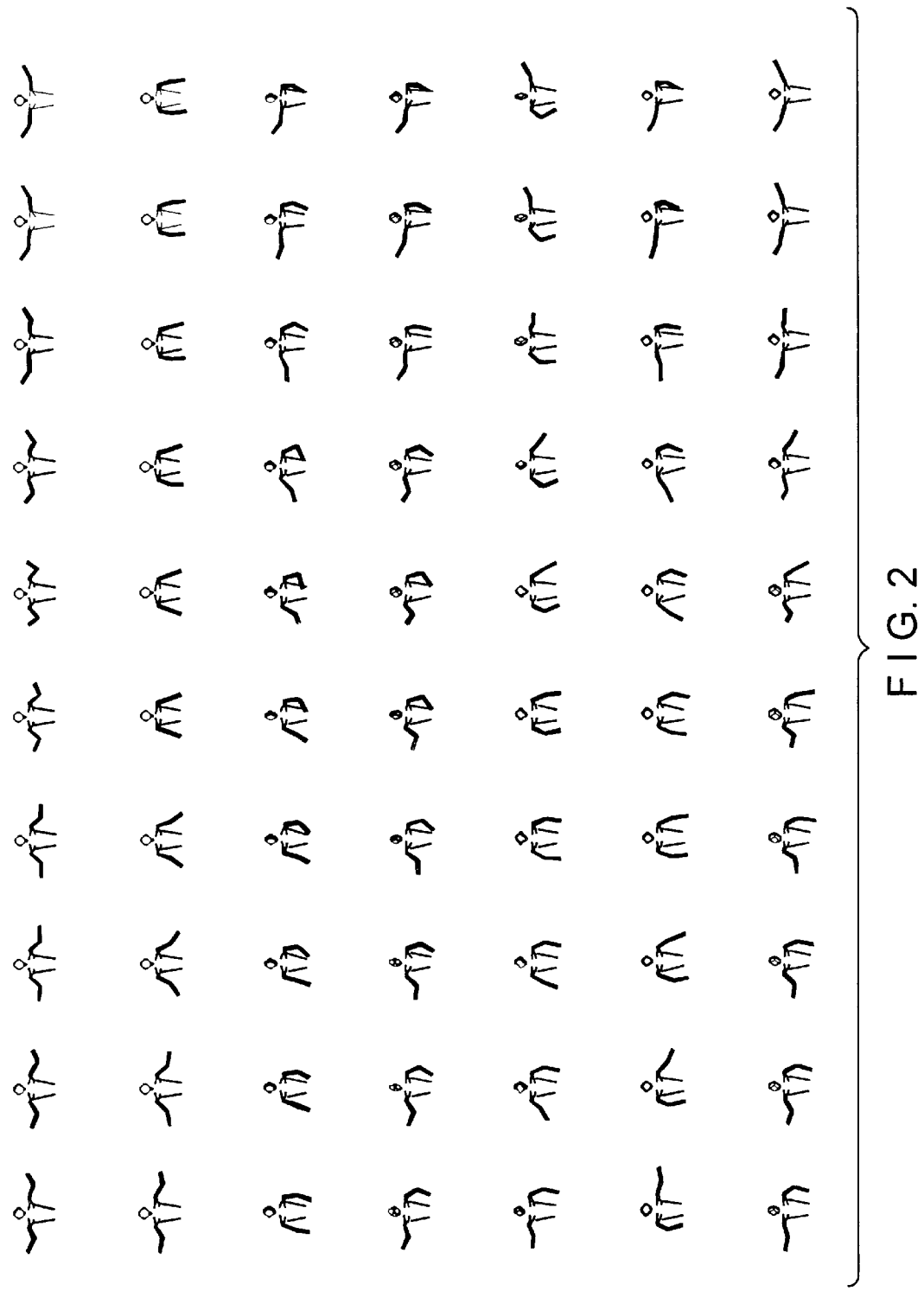
FIG. 2 shows a series of frames of an image of an animated human character moving from a "fencing gesture" to a "conducting gesture".

FIG. 2 illustrates an animated human character having emotional transitions between varying gestures. FIG. 2 shows a series of frames of an image of the animated human character moving from a "fencing gesture" to a "conducting gesture."

Unlike other computer animation programs which have sought to portray facial expressions, the gesture synthesizer of the present invention utilizes a unique approach. An innovative aspect of the gesture synthesizer is the use of stochastic controls to specify gestural effect.

The detailed description of the present invention is organized in two parts. First, it describes stochastically defined gestures, then it describes the system in which this technique is embedded.

STOCHASTIC CONTROL OF GESTURE

Theoretical Underpinnings

The present invention incorporates concepts and techniques originally utilized to create natural-looking computer graphics (visual textures) such as marbling, wrinkles, spots and bubbles. Texturing is an effective method of simulating surface detail at relatively low cost. Well-behaved stochastic functions can be combined to produce naturalistic detail, bootstrapping visual complexity with surprisingly simple and efficient algorithms. The algorithms are shape-independent so that the texture need not be fitted to the "surface" of an object and a texture procedure can be run against any shape object.

The texture paradigm is appropriate whenever a regular, well defined macroscopic motion contains some stochastic components. In the present invention, textural techniques have been applied to generate gesture actions in interactive animated characters. Gesture actions can be defined statistically; although a movement G varies from person to person and from time to time, rhythm, range of motion, posture and degree of regularity of movement define the gesture and convey the emotion. Therefore, gesture actions generated through textural techniques are lifelike and convey a sense of emotive response. The present invention includes a library of approximately thirty gesture actions such as walking, rhumba dancing, fencing, etc., although more or less actions may be used.

Language

In a preferred embodiment, the present invention uses a graphics-oriented language which (1) runs reasonably fast; (2) easily handles vectors and matrices of floating point numbers as well as operations on and between them; (3) utilizes a rotation which is particularly suitable for filtering one function through another; and (4) can be easily extended by adding fast libraries in the C language. The language should have a fast run time in order to produce the required real-time calculations. The language should incorporate a notation which clearly shows flow of control so that development and maintenance of the software are uncomplicated. The language should lend itself to the creation of small procedures so that reusable code is easily generated and procedures can be quickly tuned.

A preferred embodiment of the present invention utilizes kpl, a language developed by the inventor and first implemented in 1984 for texture generation. It is a reverse Polish language which incorporates flow control constructions (conditions, loops and procedures) and assignment. In kpl, every variable is a separate stock and the default data type is floating point. kpl is extended by routines in the C language.

Extension of Textural Movement to Gesture

The present invention assigns N input parameters to each animatable character to control the character's motion. At any moment, the character can be thought of as residing at a point in an N dimensional unit cube. Each dimension pins the lowest to the highest value of one parameter.

Drawing the Figure

Each computer-generated character is made up entirely of geometric shapes, for example, ellipsoids. Each ellipsoid is a latitude/longitude mesh of polygons.

Movement of the Component Joints

Figure 1:
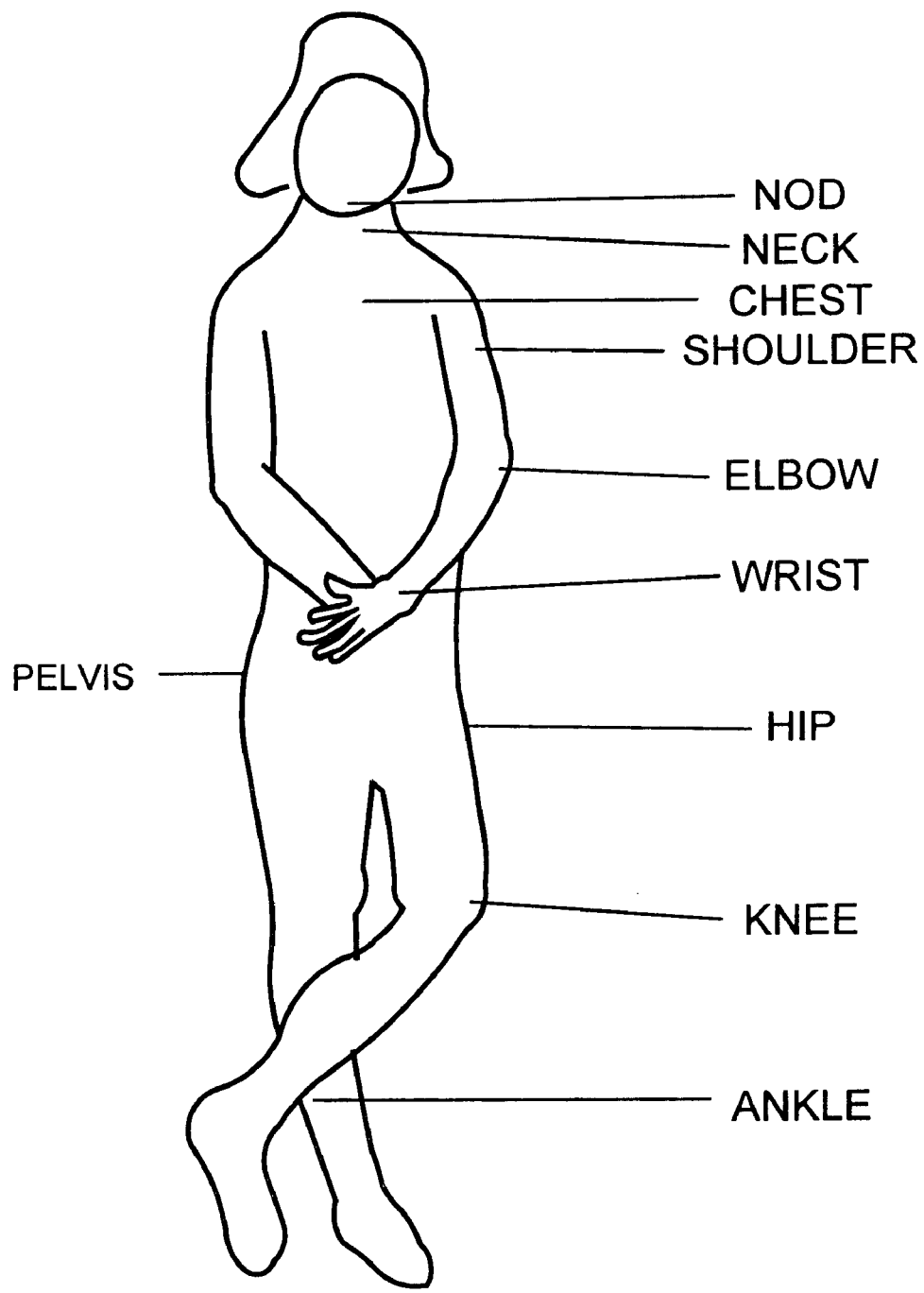
FIG. 1 shows the universal joints whose combined movements comprise a gesture.

As illustrated in FIG. 1, each computer-generated character is equipped with nineteen universal joints distributed as follows. There is one joint each for the waist and head, and two for the neck, to permit maximum expressiveness. Furthermore, each limb comprises four joints. Arm articulation consists of chest, shoulder, elbow and wrist motions. Leg articulation consists of pelvis, hip, knee, and ankle motions. The motion of each universal joint consists of up to three rotations: i.e., about the x and z axes (the two "aiming joints") followed by the y axis (i.e., a twist around the local origin).

How Movement is Effected

Actions are formed by movement of the nineteen universal joints, each joint having three axes of rotation. Two limit parameters are used to specify the range of rotation allowable around each axis. A third, time parameter, which is an expression of sine, cosine, and noise, controls the speed of movement.

Each action is specified by a table of ranges (limit parameters) and time-dependent behavior (time parameter) for each joint participating in the action. Each joint control variable may be expressed as a vector of length three (i.e., three axes of rotation) and the values in these vectors change at every frame, as they are set by actions and transitions between actions. Two limit vectors of length three (which values are passed as parameters to a computer program) consist of upper and lower limits of rotation, thereby specifying the range of rotation allowed on each of the three axes. A third time vector of length three (which values are also passed as parameters to a computer program) specifies the speed of rotation on each axis. The time varying values of the time vector act as linear interpolants between the upper and lower limits. Such interpolation is effected at any given time, t, by the equation:

$$j+(k-j)*j(t),$$

where j represents the lower limit value of a rotation about a given axis, k represents the upper limit value of a rotation about the axis, and j(t) is a function whose value varies with time between zero and one. The above equation is thus used to specify the angular position of a joint about an axis of rotation.

Following, as an example of an action, is the code to specify a rhumba dance.

```
{
    { 5 5 5 } { -5 -5 -5} { n1 n2 n3 } Nod
    {15 5 0 } { -15 -5 0} { b a } Rchest
    { 0 0 0 } { 0 0 0 } { a a } Rshoulder
    { -90 0 0 } {-70 0 0 } { a a } Relbow
    { 0 0 0 } { 0 0 0 } { a a } Rpelvis
    { -25 5 -15 } { 0 -10 0 } { a a a } Rhip
    { 50 0 0 } { 0 0 0 } { a a } RKnee
    { 0 0 0 } { 0 0 0 } { a a } Rankle
    { 0 10 0 } { 0 -10 0 } { a a } Waist
    { -15 -5 0 } { 15 5 0 } { b a } Lchest
    { 0 0 0 } { 0 0 0 } { a a } Lshoulder
    { -70 0 0 } { -90 0 0 } { a a } Lelbow
    { 0 0 0 } { 0 0 0 { a a } Lpelvis
    { 0 -20 0 } { -10 20 -25 } { a a a } Lhip
    { 0 0 0 } { 20 0 0 } { a a } Lknee
    { 0 0 0 } { 0 0 0 } { a a } Lankle
} 'rhumba define_action
```

The rhumba dance is an action which uses sixteen of the nineteen joints. At each frame, sine, cosine and noise are computed. Variable 'a' represents the sine function:

(1+sin(time))/2.

Variable 'b' represents the cosine function:

(1+cos(time))/2.

The variables a and b can be used together to input elliptical rotations, as illustrated above for the motion of the right and left sides of the animated character's chest (i.e., Rchest and Lchest). Additional variables A and B provide sinusoidal and cosinusoidal motion at double frequency:

A=(1+sin(2*time))/2,

B=(1+cos(2*time))/2.

Thus, for actions to be performed in double time, the variables A and B can be used instead of a and b.

Variables n1, n2 and n3 are independent noise sources with frequency also roughly the same as that of the variables a and b. Analogously, additional variables N1, N2 and N3 (not shown) are independent noise sources at double frequency.

Using the Nod joint (the first in the list above) as an example, the first procedure {5 5 5} represents the upper limits of the rotation ranges for the three axes x, y and z. The second procedure {-5 -5 -5} shows the lower limits for the three axes x, y and z. The third procedure {n1 n2 n3 } represents the noise variables for the same three axes. The first two procedures are run immediately and packaged up as vectors representing the extremes (limits of joint motion). The third procedure is evaluated at every frame in which the action is performed and used as an interpolant between the two extremes. In this example, the rotation around the x axis is between 5 and -5 degrees as limits and at the speed of noise n1.

Rhumba, a stylized dance step, is an example of an action that is primarily rhythmic and therefore controlled by periodic functions. Only the head motion has a little randomness (using noise as its timing) giving the impression that the dancer is looking around as she dances. The arm joints at the chest move so as to give an elliptical motion to the shoulders, creating a "latin" feel.

The code below, for standing in a casual pose, provides a vivid comparison.

```
{
    { 0 0 15 } { 0 0 -15 } { 0 0 n1 } Neck
    { 20 0 0 } { } { } Nod
    { 0 -5 0 } { } { } Lchest
    { 0 0 0 } { } { } Rchest
    { -10 0 0 } { } { } Lshoulder
    { -10 0 0 } { } { } Rshoulder
    { 0 -10 0 } { } { } Lelbow
    { 0 -10 0 } { 0 -50 } { 0 n1 0 } Relbow
    { 0 5 0 } { } { } Waist
```

-continued

```
    { -2 2 0 } { 2 -2 0 } { n1 n1 0 } Lpelvis
    { -2 -2 0 } { 2 2 0 } { n1 n1 0 } Rpelvis
    { 0 -14 0 } { } { } Lhip
    {-10 12 25} { } { } Rhip
    { -5 0 0 } { } { } Lknee
    { 25 0 0 } { } { } Rknee
} 'stand define_action
```

This action is driven primarily by noise, few joints are activated and there is no rhythmic motion. Noise gives the effect of subtle restlessness and weight shifting and prevents the character from looking like a statue.

Blink Control

Of course, additional joints, including, for example, the eyelids, may be added to provide further expressiveness to the animated character. Movement of the eyelids along a vertical axis simulates blinking, which may significantly enhance the realism of the animated character.

Transitions Between Movements

Each action has a natural frequency associated with the weight and inertia of the various body parts. The phases of all actions are synchronized by running them all off the same master clock.

At any given moment, every potential action has a weight assigned to it. For each joint, the contributions from all the actions to that joint's position are combined via a convex sum:

$$\frac{\sum_{action} (joint - portion_{action} * weight_{action})}{\sum_{action} weight_{action}} \quad \text{(Equation I)}$$

Transitioning from one action to another is accomplished by building dependencies between the weights of actions. Dependencies are controlled by state variables and continuous variables. The state variables consists of discrete boolean values; i.e., either a character wants to perform a particular action, for example, walking, or she does not. The continuous variables consist of continuous values which vary between zero and one. These values are derived by integrating the effect over time of the discrete states. These continuous parameters provide the weights for the convex sum which drives the character.

Some of these parameters are dependent on others. For example, if a user of the system of the present invention selects the "walk" action from the action library, the state variable for walking is turned on. As the animated character performs the walking action on a display, the value of the continuous parameter controlling walking gradually rises from zero to one. If the pirouette action is then selected by the user, the discrete walk state remains set but the continuous walk parameter is driven down to zero by its dependency on the pirouette parameter. When the user selects the walking action again, the pirouette state is turned off, i.e., the pirouette action is de-selected, and the continuous pirouette parameter gradually falls to zero while the presence of the walk state gradually drives the walk parameter back up to one. At this point, walking resumes.

Transition times are tuned by feel. The use of different transition times for various parts of a gesture is a powerful technique for conveying the impression of subtle intentions.

Avoidance of Obstacles/Constraints

The actions of animated characters generated in accordance with a preferred embodiment of the present invention conform to a set of simple constraints, no matter what the forward kinematics specify. More specifically, 1) a character is propelled by whichever one of its feet is on the ground; 2) the supporting foot must be at floor level; 3) obstacles are avoided by turning away from them; and 4) a character's head will not turn 180 degrees backward.

These constraints are implemented by tracking foot movement from frame to frame. Whenever the portion of the foot is significantly lower than the portion of the other foot, the program treats the lower foot as the support foot. The difference in the foot's position is measured between successive frames. The body is moved by this difference in the opposite direction. The result is that the support foot remains fixed with respect to the floor and thereby propels the body. This mechanism can be turned off for selected actions for which sliding of the support foot is desired.

Object avoidance is accomplished by equipping each object with a small repulsive force vector and monitoring the vector sum. In a similar fashion, object attraction is accomplished by placing attractor fields around openings such as doorways. Vector magnitude increases as a character nears an object. Characters are veered to the left or right to avoid objects, according to the relative orientation of the character with respect to this repulsive force.

THE SYSTEM AS A WHOLE

The surrounding software system in an embodiment of the present invention is comprised of two major components: Goal Determination Modules (GDM) and Scene Description Modules (SDM). These modules act upon individual gestures which are the outputs of stochastic procedures. The SDM provides feedback to the GDM enabling a flow of gestures and movement expressive of emotion and responsive to apparent physical laws.

The GDM is responsible for determining, at each frame of animation, a weight for each gesture action. A gesture action (g) is invoked if its weight is non-zero. Each gesture action creates values over time for some set of parameters. once all gesture actions have been evaluated, the system performs a weighted sum of each parameter, on a gesture action by gesture action basis. All parameter values are then normalized by their respective accumulated weights, as in Equation I.

An SDM can represent an animated character, a group of animated characters, or some physical objects in the scene. The SDM is provided with the kinematics, static constraints, dynamics, etc. Separating scene information from gesture information allows for very simple high level control of emotive qualities and for easy modification of them.

The SDM takes a set of scalar parameters as its inputs and outputs scene transformations (matrices) and geometry to be rendered. One SDM can be dependent on matrices computed by another.

The transformation matrices produced by the various SDM's are made available to an Analyzer module. The Analyzer produces scalar variables which are fed back into the GDM. This enables a smooth transition from one emotion to another. For example, as character B physically approaches character A, i.e., as the distance between character's A and B changes, the Analyzer evaluates their mutual distance and feeds this information back into the GDM. The GDM increases the weight of A's gesture of being sad or of waving to character B in accordance with the distance between A and B as determined by and as provided to the GDM by the Analyzer.

Figure 3:
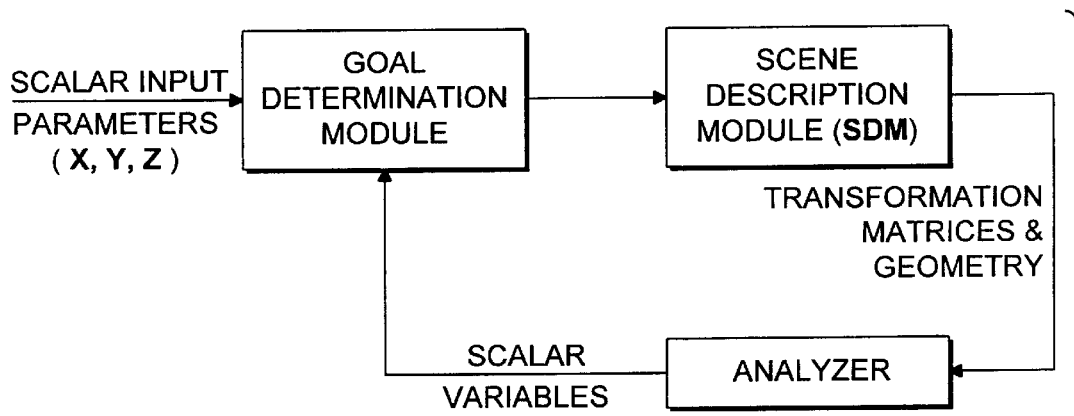
FIG. 3 is a functional block diagram illustrating the interactions among modules of a software system in accordance with the present invention.
Figure 3:
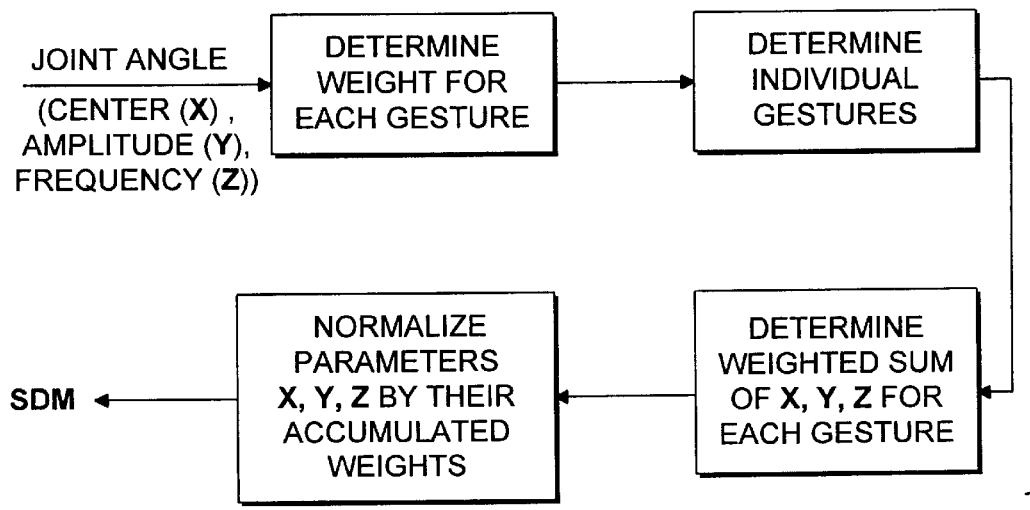

The interaction of the GDM, SDM and Analyzer, as described above, is depicted graphically in FIG. 3.

The gesture synthesizer of the present invention allows the building of and use of gesture on the level of effective communication. Potential uses of the gesture synthesizer include role playing games, simulated conferences, "clip animation" and simulated dance.

Emotive gesturing is useful for monitoring a shared electronic "talk" conference. One could model the participants as physical gesturing characters around a conference table. At a glance, one could tell who is talking to whom, who is entering and leaving the discussion, and who is paying attention to whom.

Also, the gesture synthesizer can be used in "Clip Animation", much like clip art, where, for example, an entire crowd of people reacts in a particular way to a character or event.

Further, there are additional uses for the gesture synthesizer and one can customize the gesture synthesize to meet such various needs.

The sample computer program (Appendix B) enclosed with this patent application illustrates the present invention. It is available for public inspection after a patent issues hereon; it is copyright protected; and no copyright license is granted thereunder by this permission of inspection. That computer program is written in a computer language called "kpl" which is explained in Appendix A, which is available, without restrictions, for public inspection. Appendix A and Appendix B are not intended to form part of the printed patent.

What is claimed is:

1. A computer animation method for creating animated characters which include body members coupled at joints and which perform movement gesture actions, the computer animation method comprising the steps of:

selecting a first gesture action and a second different gesture actions from a library of stochastically defined movement gesture actions, each of the first and second gesture actions being defined by values over time for a set of parameters which govern a movement at the joints of the animated characters;

rendering the animated characters as a function of the first gesture action;

further rendering the animated characters by transitioning between the first gesture action and the second gesture action by diminishing during a predetermined time interval a weight of the values of the parameters of the first gesture action and simultaneously increasing during the predetermined time interval a weight of the values of the parameters of the second gesture action to provide a smooth transition between the first and second gesture actions;

wherein the library of stochastically defined movement gesture actions includes at least one composite gesture action controlling a plurality of movements at a plurality of joints of the animated character.

2. A method for creating animated characters as in claim 1 wherein:

the set of parameters for each joint define rotations about three mutually orthogonal axes at each joint; and the parameters include maximum and minimum limits of rotation and a functional description of joint movement variation over time between the maximum and minimum limits of rotation.

3. A method for creating animated characters as in claim 1 further comprising the step of assigning attractant and repellant vectors to define relationships between each animated character and one or more obstacles.

4. A method for creating animated characters as in claim 1 wherein the weights of preselected gesture actions of two or more animated characters are determined as a function of at least one of a distance and an orientation between the characters.

5. A method for creating animated characters as in claim 1 wherein at least one movement constraint is imposed on the gesture actions of the animated characters.

6. A computer animation method for creating animated characters by creating a library of gesture actions to be selected in sequence by a user, comprising the steps of:

defining each of the animated characters as having a plurality of at least ten universal joints, each of the universal joints being defined by rotational movement about three mutually orthogonal axes;

via a software program, defining, for each action a set of parameters for each axis of rotation at each of the universal joints, the parameters including a maximum angle of rotation excursion, a minimum angle of rotation excursion and a speed of rotation; and rendering the animated characters as a function of the selection by the user, wherein the library of gesture actions includes at least one composite gesture action controlling a plurality of movements at a plurality of joints.

7. A method for creating animated characters as in claim 1 wherein the character has nineteen of the joints.

8. A method for creating animated characters as in claim 1 wherein the set of parameters of a gesture action includes a speed of rotation which is a function of noise.

9. A method for creating animated characters that convey emotion through their gestures, comprising the steps of:

(a) generating scene transformations and images to be rendered as a function of scalar input parameters;

(b) determining, for each respective gesture at each frame of animation, a weight of a set of parameters representative of the respective gesture, wherein the respective gesture is invoked if a weight of the respective gesture is a nonzero value;

(c) calculating values over time for the set of parameters of each of the gestures;

(d) performing a weighted sum of values for each of the set of parameter within each of the gestures for which the parameter is defined;

(e) analyzing the transformation matrices to produce scalar variables; and (f) modifying the weight of the set of parameters representative of at least one gesture as a function of the scalar variables and determining the scalar input parameters for generating corresponding scene transformations and images.

10. A method for creating animated characters as in claim 9 wherein the set of parameters include limits on rotation and speed of rotation.

11. A method for creating animated characters as in claim 9 further comprising the step of assigning attractant and repellant vectors to define relationships between each animated character and one or more obstacles.

12. A method for creating animated characters as in claim 9 wherein the weights of preselected gesture actions of two or more animated characters are determined as a function of at least one of a distance and an orientation between the characters.

13. A method for creating animated characters as in claim 9 wherein at least one movement constraint is imposed on the gesture actions of the animated characters.

14. A computer animation system for creating animated characters that convey emotion through their gestures, comprising:

a library of stochastically defined movement gesture actions;

scene description modules programmed with information to simulate a natural motion of the gestures by the animated characters;

a goal determination module for computing, for each of the gestures, a weight of a set of parameters representative of a respective gesture of the gestures to determine whether the scene description modules should simulate the respective gesture; and an analyzer receiving information from the scene description modules to convey to the goal determination module whether to increase, decrease or keep constant the weight of individual gestures to enable a smooth transition from one gesture to the next and restricting a character movement.

15. A computer animation system as in claim 14 wherein said scene description modules generate scene transformations and images to be rendered as a function of scalar input parameters.

16. A computer animation system as in claim 14 wherein one scene description module generates scene transformations in dependence on the scene transformations generated by another scene description module.

17. A computer animation system as in claim 14 wherein said goal determination module determines the weight for each gesture at each frame of animation.

18. A computer animation system as in claim 14 wherein the character is a human and a gesture is invoked if its weight is non-zero.

19. A computer animation system as in claim 14 wherein each gesture creates values over time for a set of parameters.

20. A computer animation system for creating animated characters which appear to move in a succession of image frames, said computer animation system comprising:

a library of gesture actions programmed with information to simulate the natural motion of gestures as expressed by the movement of body parts thereof through joint angles;

each joint angle being expressed by the parameters of rotation about three axes and the parameters including limits of rotation excursion and speed of rotation; and each frame having each character body part movement defined by the parameters at each axis of each joint, wherein transitions between gestures are achieved by simultaneously decreasing a weight of one gesture and increasing a weight of a subsequent gesture.

21. A computer animation system as in claim 20 wherein the movement of animated characters conforms to conditions apparent in each scene, such that characters avoid obstacles, enter and exit openings, and move in compliance with physical laws.

22. A computer animation method for creating animated characters which include a plurality of body members coupled at a plurality of joints and which perform movement gesture actions, the computer animation method comprising the steps of:

selecting first and second different gesture actions from a library of stochastically defined movement gesture actions, the first gesture action being defined by values over time for a first set of parameters, the first set of parameters controlling a first movement at a first joint of the plurality of joints and a second movement at a second joint of the plurality of joints, the second gesture action being defined by values over time for a second set of parameters, the second set of parameters controlling a third movement of at least the first joint of the plurality of joints;

rendering the animated characters as a function of the first gesture action; and during a predetermined time interval, further rendering the animated characters by diminishing a weight of the values of the first set of parameters of the first gesture action and simultaneously increasing a weight of the values of the second set of parameters of the second gesture action to provide a smooth transition between the first and second gesture actions, wherein the transition between the first and second gesture actions effect a first movement at the first joint without effecting a second movement at the second joint.

* * * * *

UNITED STATES PATENT AND TRADEMARK OFFICE
CERTIFICATE OF CORRECTION

PATENT NO. : 6,115,053
DATED : September 5, 2000
INVENTOR(S) : Kenneth Perlin

It is certified that error appears in the above-identified patent and that said Letters Patent is hereby corrected as shown below:

Column 1,
Line 30, "inquisitiveness since" should read -- inquisitiveness. Since --

Column 5,
Line 67, "{0 0 0 { a a }" should read -- {0 0 0}{ a a } --

Column 8,
Line 54, "SDM's" should read -- SDMs --

Column 9,
Line 35, "actions" should read -- action --
Line 58, "define" should read -- defines --

Column 10,
Line 16, "action" should read -- action, --
Line 43, "set of parameters" should read -- sets of parameters --
Line 54, "include" should read -- includes --

Column 12,
Line 40, "effect" should read -- effects --

Signed and Sealed this

Twenty-second Day of April, 2003

JAMES E. ROGAN
*Director of the United States Patent and Trademark Office*